United States Patent [19]
Gregory, Jr. et al.

[11] Patent Number: 5,583,665
[45] Date of Patent: Dec. 10, 1996

[54] METHOD AND APPARATUS FOR PERFORMING COLOR TRANSFORMATIONS USING A REFERENCE IMAGE COMBINED WITH A COLOR TRACER

[75] Inventors: H. Scott Gregory, Jr., Bedford, Mass.; Christopher M. Heinz, Nashua, N.H.; Timothy K. Rodgers, Jr., Concord, Mass.; George B. Pawle, North Reading, Mass.; Douglas G. Walker, Boston, Mass.

[73] Assignee: Eastman Kodak Company, Rochester, N.Y.

[21] Appl. No.: 387,550

[22] Filed: Feb. 13, 1995

[51] Int. Cl.⁶ ............................... H04N 1/56; H04N 1/60
[52] U.S. Cl. ......................... 358/504; 358/518; 358/537
[58] Field of Search ............................. 358/518, 520, 358/523, 537, 530, 504; 395/131, 109; 345/150, 199

[56] References Cited

U.S. PATENT DOCUMENTS

| | | |
|---|---|---|
| 4,500,919 | 2/1985 | Schreiber . |
| 4,524,421 | 6/1985 | Searby et al. ............................ 395/131 |
| 4,829,370 | 5/1989 | Mayne et al. . |
| 5,142,616 | 8/1992 | Kellas et al. . |
| 5,157,506 | 10/1992 | Hannah . |
| 5,208,911 | 5/1993 | Newman et al. . |
| 5,212,546 | 5/1993 | Arazi et al. . |
| 5,243,414 | 9/1993 | Dalrymple et al. . |
| 5,249,263 | 9/1993 | Yanker ..................................... 395/131 |
| 5,254,978 | 10/1993 | Beretta ..................................... 395/131 |
| 5,257,097 | 10/1993 | Pineau et al. . |
| 5,271,096 | 12/1993 | Cook . |
| 5,293,258 | 3/1994 | Dattilo . |
| 5,296,947 | 3/1994 | Bowers . |
| 5,313,291 | 5/1994 | Appel et al. . |
| 5,315,416 | 5/1994 | Taniuchi et al. . |
| 5,323,249 | 6/1994 | Liang . |
| 5,339,176 | 8/1994 | Smilansky et al. . |
| 5,461,493 | 10/1995 | Venable ..................................... 358/520 |

FOREIGN PATENT DOCUMENTS

| | | |
|---|---|---|
| 0144188 | 6/1985 | European Pat. Off. . |
| 0501942 | 2/1992 | European Pat. Off. . |
| 2590042 | 11/1985 | France . |
| 62-273970 | 5/1989 | Japan . |

*Primary Examiner*—Scott A. Rogers
*Attorney, Agent, or Firm*—Peyton C. Watkins

[57] ABSTRACT

A system that combines a reference color image with a color move tracer image creating a combined image capable of being edited as desired by the operator and one which records the actual color edits made on the reference image. The tracer is a color grid that represents the domain of colors in a specified color space encoding. The grid is converted into a color edit transform table and the color edits within the color space on a higher resolution version of the reference image, or on other images, can be performed using a table look-up operation. The invention can also be used to capture effects transforms that modify the input/output and/or screen display of an image without necessarily modifying the original image.

16 Claims, 4 Drawing Sheets

METHOD AND APPARATUS FOR PERFORMING COLOR TRANSFORMATIONS USING A REFERENCE IMAGE COMBINED WITH A COLOR TRACER

BACKGROUND OF THE INVENTION

1. Field of the Invention

The present invention is directed to a system for recording color transformations made to a reference image and creating a transformation to be applied to subsequent images from the recording and, more particularly, to a system in which a color change recording tracer representing the domain of colors of a designated color space is attached and made integral with an image, the image, including the tracer, undergoes color changes controlled by a user which consequently changes the tracer and the color changes recorded by the tracer are used to create a transformation that is used to transform other images.

2. Description of the Related Art

Today it is often the case that an operator of a color processing system will want to make color changes or "edits" in a color space or coordinate system, such as LAB, to a reference color image and then use those reference color image changes to guide the changes to a large collection of other similar images also in that same color space (LAB).

The prior art allows the operator to do this by making the changes and recording the changes as a script of operator key strokes, etc. The script, which is separate and apart from the image that has been changed, is then used to guide the same operations on other images. In this method the operator can see the effect of the changes on the reference image, however, the changes are recorded in a way that makes it difficult to perform such changes on a large number of images since completely executing all the keystrokes, etc. of the operator for every image that needs to be changed is very time consuming.

The prior art also allows color edits to be made in the transformation that changes color values from one color space to another, such as from LAB to RGB. In this space-to-space conversion the operator is presented with a color domain table in visual form in the source color space, which is converted to the destination space through a given translation method, and which is presented visually as it would appear in the destination color space. The translation method is recorded in the table and is used to govern the conversion of other images into the destination color space, for example to convert color values in LAB to color values in the RGB space. In this method the user has no reference image on which to view the color edits and the changes do not reflect any changes that the operator wants to make to the image while it is in the target color space.

Another method of calibrating between color devices is described in U.S. Pat. No. 5,339,176. In this method a digital color image, which can be a group of color blocks or an image of a scene, is digitally converted from one space into another space and the two color images are compared to determine the error between the images. The comparison is performed by measuring the color differences between analog versions of images using a color reading device, such as a reference colorimetric scanner. The error is used to construct a corrected transform that will allow accurate reproduction in the second color space. Once again this method leaves the operator with no way of recording the in-space color edits that the operator may want to make to the image in either the first or second spaces before or after the space-to-space transformation.

Because of the complexity of learning and using color processing packages, the operators of color processing systems want to be able to rely on using color processing packages with which they are familiar. As a result, even if a package has new and very useful features operators tend to use the older packages because of familiarity.

What is needed is a method that allows an operator to see the effect of the color edits, records them along with the changes made in the image and records them in a format that allows easy creation of color transformations for other images while allowing the operator to use a package to make the changes with which the operator is familiar.

SUMMARY OF THE INVENTION

It is an object of the present invention to provide a system in which the image being processed records the color edits made by an operator.

It is another object of the present invention to allow an operator to use a color processing package with which the operator is familiar while recording color edits.

It is a further object of the present invention to record color edits within a color space in a manner that facilitates easy creation of a color transformation for application to a higher resolution form of a reference image, or for other images.

It is also an object of the present invention to provide a special image that combines a reference image with a color edit tracer to allow color edits within a color space to be recorded and to record the effects of color transformations between color spaces.

It is another object of the present invention to record color edits within a color space in a manner that facilitates creation and use of a color transformation that modifies the output form (color) and/or screen display of the image without modifying the original image data or base picture.

The above objects can be attained by a system that combines a reference color image to be changed by an operator with a color edit tracer image creating a combined image capable of being changed as desired by the operator as well as one which records the actual color edits made on the reference image. The tracer is a color grid that represents the domain of colors that are available in the color space. Global changes in the combined image within the color space made by a conventional color processing package change the color image as well as the colors in the grid. The grid, with the color edits recorded therein, defines the color edits within the color space. The grid is converted into a transform or move table and the color edits within the color space can be performed on other images using a table look-up operation. The edit capture mechanism of the tracer captures local edits through a global capture of selective color edits, and through a global capture of any color edits that are linked to a spatial region of the image through a mask defining the region. By transforming the combined image from a source color space into a destination color space with a preferred method, then inverse transforming back into the source color space with an application-specific conversion method, any errors caused by the application's space-to-space transformation can be recorded and the recording used to compensate for any errors.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
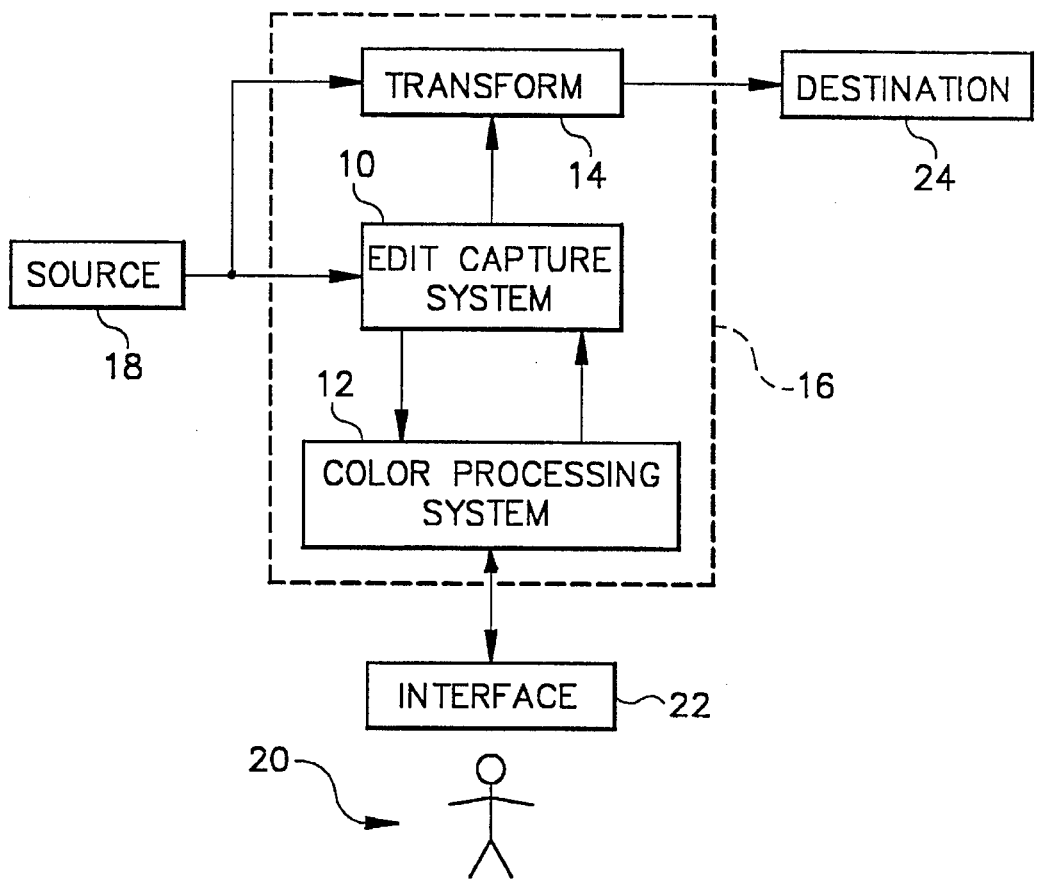
FIG. 1 illustrates the interaction of the present invention with a conventional color processing package or system.

The present invention, as illustrated in FIG. 1, is directed to a color image edit capture system 10 designed to work with and be transparent to a user of a conventional color processing package or system 12. The system 10 captures within-space color edits in a reference color image made by an operator (that is, color edits made to an image within the same color space) and allows a table based transform 14 to be created from the captured color edits either within the image editing application or in a post process. The transform can then be used to perform the identical color edits on other images. The edit capture system 10 illustrated in FIG. 1 is a process executing in a conventional workstation or desk top computer 16, such as an Apple Macintosh computer system. The system 10 obtains an image, preferably a low resolution version of a high resolution color image, although the image can be a high resolution image, from an image source 18, such as a scanner, a camera, a compact disk, such as PHOTOCD, or some other source of digital image data. The image is typically in a particular color space or coordinate system, such as RGB, YCC or CMYK, and is converted into a coordinate system or color space, such as LAB, of the conventional color processing system or package 12, such as Adobe PHOTOSHOP. A color edit tracer is attached to or made into an extension of and integral with the reference image and the combined image, containing the tracer and the reference image, is provided to the color processing system 12. An operator 20, through a conventional color workstation interface 22, such as a keyboard, mouse and CRT display, conventionally color edits the reference image using within-space color edits that apply globally to the reference image as well as to the tracer. That is, the color edits made by the operator make changes in the entire combined image, including the reference image and the tracer, and the tracer records the global color edits. The color edits may effect color values in the grid that do not appear specifically in the reference image. The combined image, once the operator is finished making the desired changes, is transferred back to the edit capture system 10 and the edit capture system 10 produces the table based transform 14 which is used by the computer 16 to conventionally transform other images, preferably high resolution images and typically in a batch mode, and supply them to a conventional destination device 24, such as a printer, display or storage device.

Figure 2:
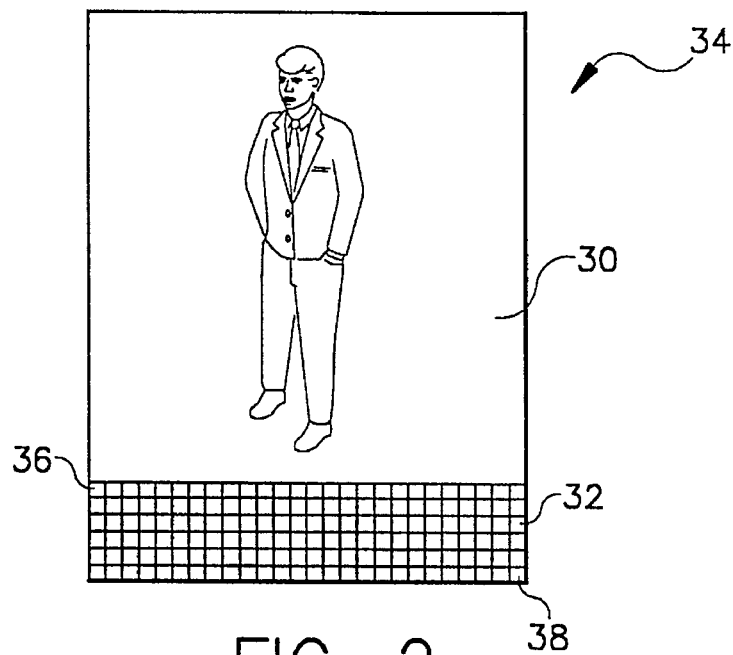
FIG. 2 depicts a combined image including a reference image and a tracer grid.

The combining of the reference image with the tracer involves obtaining the reference image 30, as a data file, and concatenating the tracer 32 to the end of the file as illustrated in FIG. 2. That is, the tracer 32 and reference image are combined into a single file 34. In the preferred method, the source image 30 is first converted to a reference color space via an input characterization transform. The tracer 32 is also created in the reference color space and then appended. The tracer 32 is a grid of colors that represent the entire domain of a color space encoding, such as the byte-encoding of Photoshop LAB. The tracer grid 32 is constructed such that it is a representative sampling, preferably, of all of the colors of the color space of the reference image. The grid is not a sampling of all of the colors in the color space of the reference image, always. The image 30 and tracer 32 may originate in different spaces (RGB and uvL) and both be converted to LAB before they are merged and then subjected to editing. The important point is that, after conversion to the edit space, the tracer 32 cover the domain over which it is desirable to capture color edits. A gray scale image would have a sampling of grays, an RGB image would have a sampling of RGB colors, and a CMYK image would have a sampling of CMYK colors. The most common sampling is a uniform sampling of the color space, however, other samplings for a variety of purposes may also be used. Because the grid 32 originates in a color space that could be different from the space of the color processing system 12, it may be necessary to convert the color values of the grid 32 to color values of the color processing system 12. A similar conversion may also be necessary for the reference image 30. For example, the conventional color processing system 12 mentioned above performs the processing operations in the LAB color space or coordinate system. If the reference image is retrieved in a color space different from the color space of the system 12, such as when the image is from a scanner and is in the RGB color space of the scanner, the reference image must also be converted into the color space of the system 12. This space-to-space conversion or transform is a conventional operation. Because the grid 32 and the reference image 32 are part of the same combined image 34 any global color edits made by the operator using the system 12 which effect the reference image 30 also affect the grid or tracer 32. As a result, the grid 32 records the color edits made to the reference image 30. An example of this is illustrated and described with respect to FIG. 3.

Figure 3:
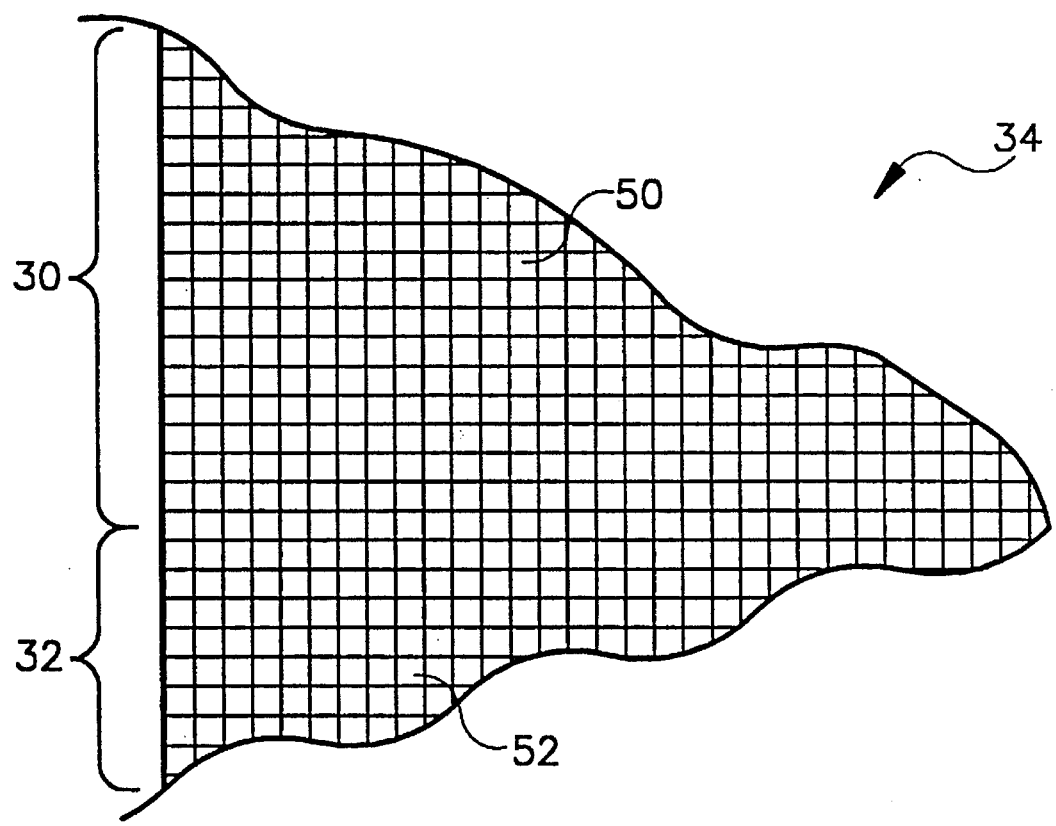
FIG. 3 depicts the image of FIG. 2 in more detail.

FIG. 3 illustrates a greatly magnified version of the combined image 34 as it could appear on a CRT display and shows the pixels of a small section of the reference image 30 and a small section of the grid 32. In this image 34 we will assume for the sake of invention explanation that two pixels 50 and 52 exist, one (50) located in the reference portion 30 of the image 34 (and the data file) and one (52) located in a known location in the grid portion 32 of the image 34 (and the data file). We will also assume that prior to processing by the operator 22 using the system 12 the pixel 52 has a known color value, such as R=100, G=125 and B=150, and that pixel 50 in the reference image 30 also happens to have the same RGB color value (100,125,150). The operator 22 using the color processing system 12 views the reference image 30 and decides that a global color change, such as a color cast correction, is necessary that affects pixel 50. A global color change, such as a color cast correction, can affect not only pixels that actually appear in the image 34 but also can affect pixels with closely related colors that may not actually appear in the image 34 but that are represented by the grid 32. The operator particularly applies the global color change to the image 30, but since the image 30 is part of image 34, the change is applied to the combined image 34 using the techniques prescribed by the system 12. This changes the color of all pixels of image 34 associated with the global change, including pixels that are not actually in the image 34 but represented by the grid 32. Assume that the color edit has changed the value of pixel 50 to R=100, G=125 and B=100. Because the color edit was applied to the entire combined image 34, the color value of pixel 52 has also been changed to match that of pixel 50, that is pixel 52 now has value (100,125,100). This new color value for the pixel 52 of the grid 32, as well as the changes to any closely related pixels found in the grid 32, can be used to define a color edit transform.

As discussed previously, the grid 32 is combined with the reference image 30 by adding it at the end of the image file with the result that the location of pixel 52 within the combined file is known, the color value of the pixel 52 prior to the color edit is known (110, 125, 150 in this example) and the color value of pixel 52 after the move is also known (100, 125, 100 in this example) because the color value of the changed pixel is recorded in the grid, and, as a result, a transform in the form of a table can be created which can be used to duplicate the color edit on other images. For example, a three dimensional table can be created that includes as an index or input point the RGB color value 100,125,150 and has as an entry or RGB output value 100,125,100 and whenever any pixel in a new image has the RGB value 100,125,150 the table can be used to look-up the new or transformed RGB value 100, 125, 100. Because the grid 32 covers the entire color space domain all the color changes within the color space in a reference image 30 are recorded and can be used to create a transform for making the same within-space color edits to other images.

Figure 4:
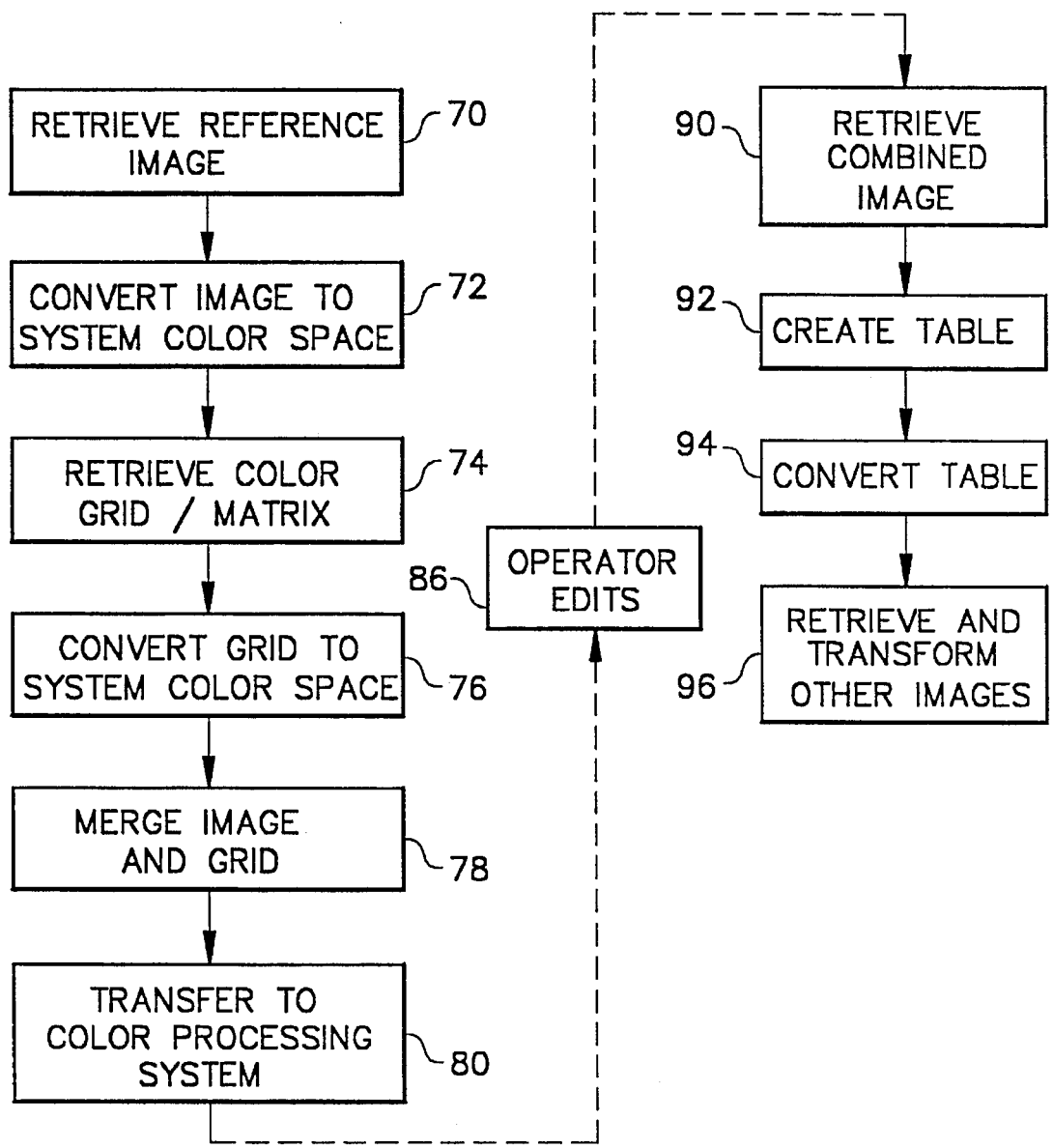
FIG. 4 illustrates the steps of the within-space color edit capture and transform process of the present invention.

The process of capturing the color edits of the reference image 30 begins, as illustrated in FIG. 4, with retrieving 70 the reference image from the image source device 18 in a conventional format, such as TIFF. As noted previously, because the image will be processed using a typical low resolution color workstation CRT display, it is preferred that reference image 30 be a low resolution image. Because the source may provide the reference image 30 in a color space different from the color space of the conventional package used by the operator 22, the next step 72 is to convert the reference image 30 to the color space of the package which in the case of the Adobe PHOTOSHOP could be LAB. The grid 32 which will be combined with the reference image is then retrieved 74 from a uniform color space, such as a byte-encoded CIEUVL. Because the grid 32 is produced from a uniform continuous space, the tracer needs to be of a reasonable size; the grid 32 is preferably a representative sampling of the colors of the three dimensional color space and is preferably a uniformly spaced three dimensional grid 32 of samples with 16 samples on a side resulting in a grid of 4096 samples. The grid 32 is converted into an ordered list of color values where the location of each color value within the list is known. The color values in the list are then converted 76 into color values of the system 12 color space to match the color space of the converted reference image 30. Next the converted reference image and the converted grid or list are merged 78 into a single file by adding the grid 32 to the end of the reference image file or concatenating the image and the grid files, creating a new combined file that includes both the reference image 30 and the grid 32. Control of the combined image file is then transferred 80 to the conventional color editing package or system, such as the PHOTOSHOP system previously mentioned.

The operator then uses the conventional tools of the package 12 to perform 86 the desired color edits to the combined image file.

It is preferred that the grid be positioned, with conventional windowing techniques, in the background or behind the reference image window, so that the grid 32 will not affect the color edit choices made for the reference image 30 by the operator. If such visual separation is not possible due to the limitations of the particular color editing package chosen for implementation, to facilitate this needed visual separation a separator or band of a neutral color can be provided in the combined file and located after the reference image 30 but before the grid 32.

Once the operator is finished with the color editing process and the grid 32 has recorded the color edits, the present invention retrieves 90 the grid 32 from the combined image 34. Because the grid 32 is located in a known location in the combined image, it can be extracted from the combined image. Because the color values of the grid 32 are located in a known location, the edited color values can be read. The extracted grid values are used to populate three separate three dimensional lookup tables, one for each of the components of the color space of the grid. Each lookup table is created 92 such that it exactly matches the original grid's sampling of the domain of the grid's color space. Each value from the extracted grid is inserted into the lookup table location which corresponds to its position in the original grid. The three lookup tables are a representation of the functions $x'=f1(x,y,z)$, $y'=f2(x,y,z)$, and $z'=f3(x,y,z)$. These functions together describe the net transform of the original color $(x,y,z)$ into the resultant color $(x',y',z')$. A variety of methods can be used to transform a color using these lookup tables, including, but not limited to, nearest neighbor, linear interpolation, and cubic interpolation. These techniques of using tables for transformation using three functions, each with 3 input variables, are well known and could be used with N functions with N input variables. This transform extraction can be performed within the image editing package, through "plug-in" architectures or in a separate application (e.g., on a remote server system). This table constitutes the transform or color change profile that can be used to make the same color edits to other images. However, if the color space of the conventional color package or system is not a preferred space for creating or applying color edits, it may be necessary that the table be converted 94 into another desired color space. As a result, additional transformations between spaces may be required. The converted table can then be used to make identical color edits 96 within the desired color space as those made on the reference image on as many other images as desired.

The table only includes a sampling of the colors of the original color domain. Therefore the transformations preferably use conventional techniques, such as trilinear interpolation, to transform color values which fall between table entries. In addition, it is preferable to store the transformation table in well known formats such as the Eastman Kodak Co. Color Management System format or the International Color Committee (ICC) Profile specification. Color edits captured based on end user adjustments of the default color reproduction performance of a device are referred to as effect transforms in the Kodak Color Management System (CMS), and as abstract profiles in the ICC specification. It is preferred that effect transforms are captured, stored, and applied in the byte-encoded reference color space (RCS) of the CMS framework, which is CIEUVL in the Kodak Precision CMS, and CIELAB in the ICC Profile specification.

Figure 5:
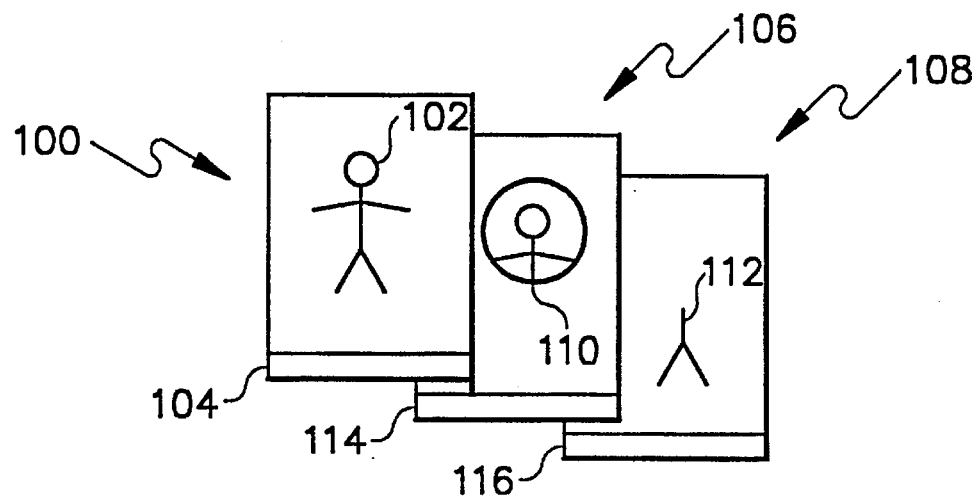
FIG. 5 depicts regional color edit recording.

The above discussion described the present invention with respect to providing only a single tracer for a reference image. It is possible to take advantage of the masking capabilities of the conventional color editing packages to provide tracers for spatial regions of an image, as shown in FIG. 5. For purposes of this discussion, a global tracer is defined as a tracer used to capture an edit transformation that is intended to modify the entire image. A regional tracer is defined as a tracer used to capture an edit transformation that is intended to modify a subset of the image area, for example, by a spatial mask selecting a given region of the picture, where the tracer is logically associated with the mask. In this embodiment the combined image 100, which includes the reference image 102 and a global tracer 104, is accompanied by masked versions 106 and 108 of the combined image 100 which each include a portion 110 and 112 of the reference image 102 as well as corresponding tracers 114 and 116, respectively. The masked versions of the original image can be linked to the original by mechanisms available in many open file formats such as TIFF. The tracers 114 and 116 record the color edits made to the masked versions of the reference image whenever the masked versions are edited. By performing the original color edits and the subsequent transformations of other images in an order starting with the global tracer and then the regional tracers, the present invention provides a method of recording and performing global as well as spatially localized or regional color edits.

The present invention is particularly appropriate for the color corrections necessary for monitor-to-proof agreement. When monitor-to-proof agreement is desired an operator visually compares a color proof or color print to the reference image as it appears on a CRT monitor. A monitor image is color edited until the screen display visually matches the proof. The tracer can then be extracted and converted to a transformation table as described previously. This transformation can be applied to the monitor view of other images to achieve monitor-to-proof agreement.

While most examples of tracer applications relate to the capture of subjective or arbitrary color edits, it is also intended that color edits can be created by reference to specific aims, such as highlight, shadow or color bar target values. In addition, the tracer can be used to capture objective color edits, as is the case with the error correction method that follows. In this embodiment, the tracer does not have to be attached to a reference image.

Figure 6:
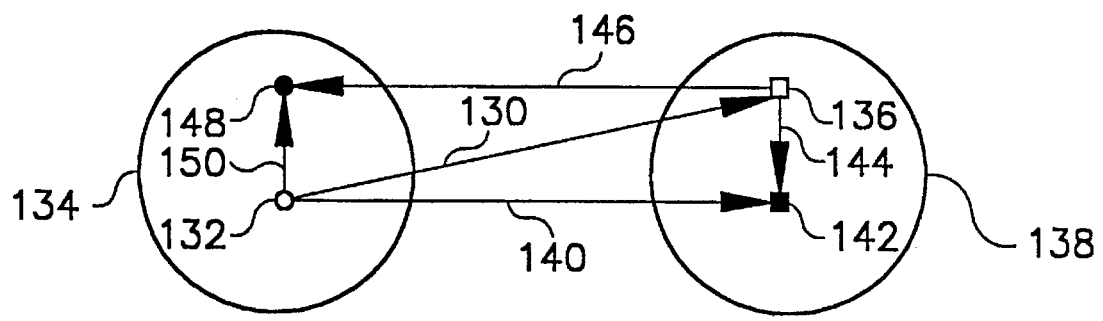
FIG. 6 illustrates how the present invention can be used to capture space-to-space transformation errors.

The present invention can also be used to record and correct for the distortions that can occur in color values during transformations between color spaces or coordinate systems that are necessary for normal user functionality, but outside the direct control of the overlaid color management software. For example, an LAB image must be converted to RGB values for display through some conversion native to the image editing package 12. In the case of PHOTOSHOP, this conversion is accomplished through a table generated based on monitor preference settings. However, these values are not equal to actual values that might be established through spectral measurements of the monitor display subsystem. In this case, the invention can be used to capture the differences between native values and desired values and store them in a compensation transform that is subsequently inserted in the display path for the LAB image data, so that the native color space conversion values are replaced by the preferred values. An example of this is illustrated in FIG. 6. The desired transformation 130 from a source point 132 in a first color space 134, such as LAB, to a destination point 136 in a second space 138, such as RGB, reflects a perfect transformation from the first space 134 to the second space 138. What sometimes occurs is a transformation 140 from the source point 132 to a destination point 142 which is different from the desired point 136 producing an error 144. To capture the error the transformation can be performed in the reverse direction 146 using an inverse of the table used for the transform 130. This will produce a point 148 which should correspond to the point 132 but which is offset by the error 150. The error 150 corresponds to the error 144. The tracer of the present invention can be used to capture this error by placing the tracer in the second space 138, through a preferred transform 130. The inverse table of the applications native color space conversion transformation 146 is then used to convert the tracer to the first space 134. Because the color values of the tracer are changed by the inverse transformation and include the transformation errors, and because the original color values of the tracer are known, an error compensation table can be created which performs the transform of points such as transforming point 132 into the point 148. The point 148 can then be transformed by the original space-to-space transformation 146 into the point 136, thereby correcting the transformation error. In this manner, each point in the entire image is corrected by being passed through the error compensation transform for a given monitor characterization.

Alternatively, the error compensation can be applied following the application's conversion from one color space to another. This method is preferred when it is desirable to preserve the original image data in the source color space 134. In this method, for example, RGB values are captured from a display buffer, and transformed to the color space of the error compensation table for its application. At this point, subjectively defined monitor print agreement effect transforms can optionally be applied. The corrected image data is then inverse transformed back to RGB values for display. The preceding method for capture, adjustment, and redisplay of RGB values is described in U.S. Pat. No. 5,257,097.

As can be seen from the discussion above a transform table can be created in one color space using the present invention and can be applied to images in other color spaces by combining it with other transformations. For example, an image can be converted from YCC to CMYK, with the conversion incorporating an edit transformation. Rather than converting directly from YCC to CMYK, this transformation series takes the form YCC–LAB+LAB–LAB+LAB–CMYK. For efficiency considerations, especially when the tracer is to be used to batch process a large number of images, it is preferable that all these tables be combined or composed into a single table, so that the transform YCC–CMYK is performed. Techniques for transform composition are taught extensively in U.S. Pat. No. 5,208,911, herein incorporated by reference.

It is also possible to use the invention to record output effects transforms. The ability to construct a tracer grid in whatever color space the reference image is stored enables the recording of color edits in a variety of stages in the processing of an image. For example, the color edits can be recorded in RGB, in which case the captured color edits would be applied to a target image before the image is converted to an output device's color space (such as CMYK). Alternatively, the image could be converted to CMYK first and then the color edits could be captured. These color edits would be applied to an image after the image has been converted to CMYK. This would allow the captured color edit to be stored in the processing path of the output device such that it could be applied to every image processed through that path. For example, the UVL to CMYK transform for a proofing system would be followed by a CMYK1 to CMYK2 adjustment table, either in composition or in series. The original underlying image data is not adjusted, only the image data forwarded to the selected output path for rendering is modified.

In certain cases, it is necessary to adjust values in a device-specific color space, such as CMYK, for halftone printing, most notably if that is the only image representation readily available. In this case, the tracer methods can be used through conversion of the image file to a reference color space, but preferably are manipulated via a tracer in the device-specific CMYK color space. One reason to stay in a device-specific CMYK color space is due to the indeterminate nature of the 3 channel to 4 channel conversion, which does not guarantee the return of unedited values to their original CMYK values.

Similarly, the image data forwarded to the monitor need not be modified by the output effect. The display may be modified by the equivalent effect if desired, or by other selected monitor proofing effects, at the discretion of the operator. For example, RGB forwarded to a display buffer can be intercepted, transformed and then returned to the display buffer through a process described in U.S. Pat. No. 5,257,097. The transform series in this example might convert RGB to UVL through a generic monitor transform, then to $UVL_2$ through a monitor compensation effect, then to $UVL_3$ through an output simulation transform, then to $UVL_4$ through a monitor-to-print agreement effect transform, then back to RGB through the inverse of the generic monitor transform. Alternatively, the order of the output simulation transform and the monitor print agreement effect transform can be swapped depending on architecture considerations, and still yield a legitimate implementation of output prediction. The present invention also supports the creation of an editorial correction on a per picture basis.

As previously discussed, the transformation table that captures a series of color edits may, if desired, be created on a relatively low resolution version of a picture. Because color editing often requires human judgment, it is preferentially handled in an interactive manner. That is, the user should be able to see the effects of his corrections in real time on a computer display. In the case of high resolution (or "large") images, this requirement for interactivity necessitates expensive computer platforms. However, by using the present invention, color edits may be made on a low resolution (or "down-sampled") version of an image and captured in a transformation table. This may be done using typical desk-top computer hardware. Furthermore, the reduction in resolution is typically not a hindrance to image processing tasks, such as making color edit decisions. Once captured as a transformation table, a particular color edit may be applied to other images. Certainly, it will be desirable to apply the color edit transform to the high resolution version of the image for which it was designed. Additionally, there may be a series of other images that would benefit from application of the identical color edit transform. For example, this is often the case when it is desired to use several images from the same roll of film and which were taken in the same location. The present invention would then allow the color edit to be created using a single representative image and then applied to the whole series, thus saving time. Another benefit associated with the reusability of the transform is the capability of generating the edit transform on one computer and applying it on another. To illustrate, we use the example of a company producing a magazine that incorporates color images. The color edits may be made on workstations operated by the design staff using low-resolution "proxy" or "for-position-only" images. The edited tracer may be converted into the transform in the workstation, or later, on a production server. The transform, if produced in the workstation, may then be sent to a compute server in the production department for application to the corresponding high-resolution images in anticipation of output to separation film.

The tracer has also been described as being appended to the end of the reference image file and being displayed as a grid or pixel strip at the bottom of the image. It is possible to place the tracer at other locations such as on the sides or top of the image. Different implementations can give consideration to more transparent methods for recording the color edits in the tracer without the visible presence of the tracer. This "invisible" tracer which is a virtual part of the image being globally changed is achievable through a variety of software techniques.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

Parts List

10 Edit capture system
12 Color processing system
14 Transform
16 Computer
18 Source device
20 Operator
22 Interface
24 Destination device
30,102 Reference image
32,104 Tracer/grid/pixel strip
34,50,100 Combined image
36,38,50,52 Pixels
70–94 Process steps
106,108 Combined mask image
110,112 Mask image
114,116 Mask tracer
130,140,146 Transform
132,136,142,148 Color value/point
134,138 Color space
144,150 Error

What is claimed is:

1. A color transform capture method, comprising the steps of:

providing a reference image as a data file;

concatenating a color tracer as a data file to the data file of the reference image for creating a combined image having the reference image and color tracer integrally attached so that the location of each pixel in the combined image is detectable by a computer; and performing color changes on the combined image for changing the reference image and recording color changes in the tracer.

2. A method as recited in claim 1, wherein the color changes comprise operator made color edits.

3. A method as recited in claim 1, wherein said reference image comprises a low resolution version of an original image and said method further comprises using the color changes captured in the tracer to perform global color changes in the original image.

4. A method as recited in claim 1, further comprising using the color changes captured in the tracer to perform global color changes on additional images.

5. A method as recited in claim 1, wherein the color changes occur within a color space.

6. A method as recited in claim 5, wherein the color edits captured by the tracer are globally applied to an image following image capture and prior to image redisplay.

7. A method as recited in claim 5, wherein the color edits captured by the tracer are applied data of an original image to produce a display image.

8. A method as recited in claim 5, wherein the color edits captured by the tracer are applied to all images transversing an image path to produce result images without modifying the images.

9. A method as recited in claim 1, wherein the color changes occur due to a transform between color spaces.

10. A method as recited in claim 4, wherein the using step comprises:

creating a color transform table from the tracer; and inputting color values from the additional images to the table and outputting transformed versions of the additional images.

11. A method as recited in claim 1, wherein said color tracer and said reference image are linked to form an integral color processing object.

12. A method as recited in claim 1, wherein the tracer is detached from the image, and changes are recorded in the tracer subsequent to the color changes of the reference image.

13. A color transform capture method, comprising:

attaching a color tracer to a reference image creating a combined image;

performing color changes on the combined image changing the reference image and recording color changes in the tracer; and wherein said combined image comprises a global tracer corresponding to the original image and a regional tracer corresponding to the regional masked image.

14. A color transform capture method, comprising:

producing a color change tracer;

converting the color change tracer to a desired color space from a source space using a space-to-space transform;

applying an inverse of the space-to-space transform to the tracer; and extracting changes in the color tracer to obtain compensation values for the space-to-space transform, which compensation values include a difference in pixel value between a pixel in the source space before converting the color tracer and its corresponding value after applying the inverse of the space-to-space transform for identifying a transformation error caused by converting from the source space to desired color space.

15. A method as recited in claim 14, further comprising using the compensation values to correct display data.

16. A color capture method, comprising:

creating a computer-readable data file of a color tracer comprising a sampling of a domain of colors of a reference image; and performing color changes on a computer-readable data file of the reference image which file is concatenated integrally with the data file of the color tracer, and recording the color changes in the tracer.

* * * * *